No. 782,952. PATENTED FEB. 21, 1905.
H. T. DUNBAR.
WHEEL.
APPLICATION FILED FEB. 23, 1904.
3 SHEETS—SHEET 1.
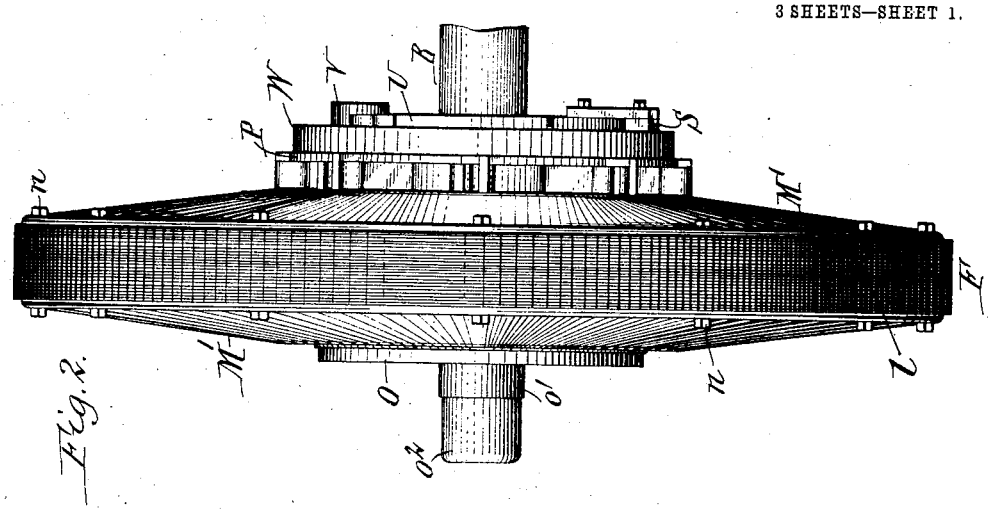
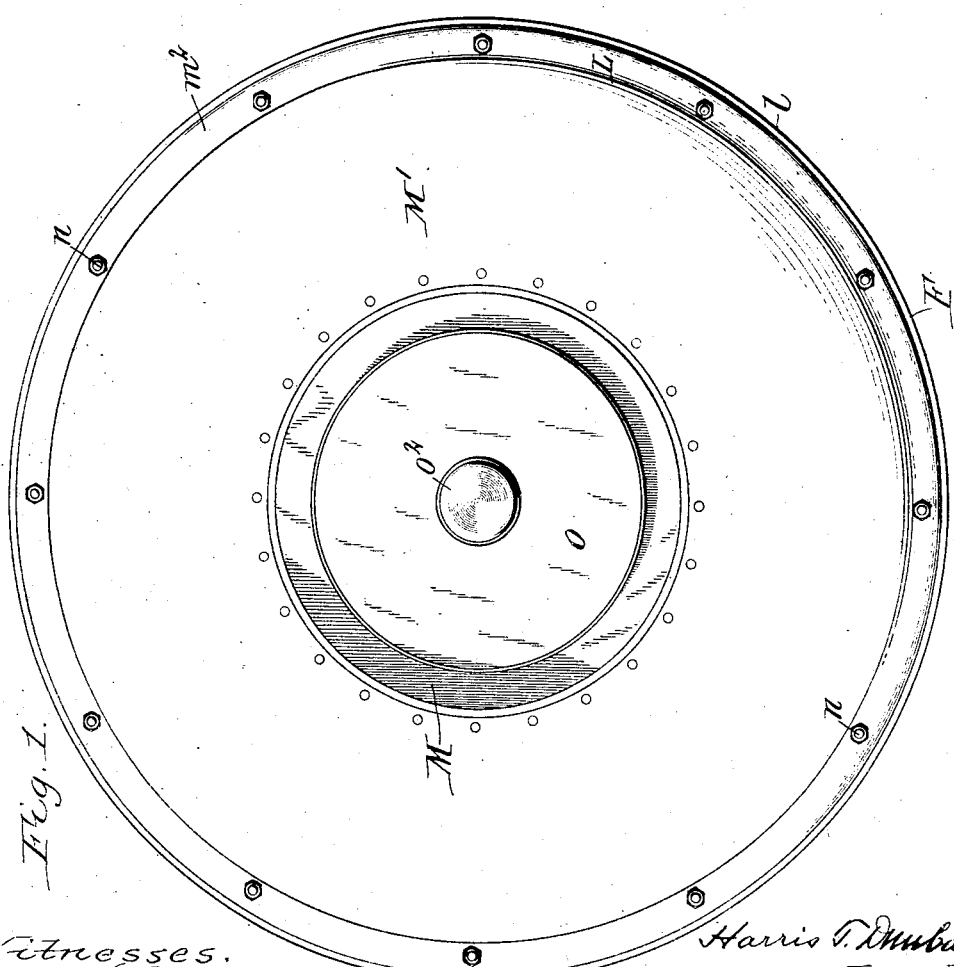

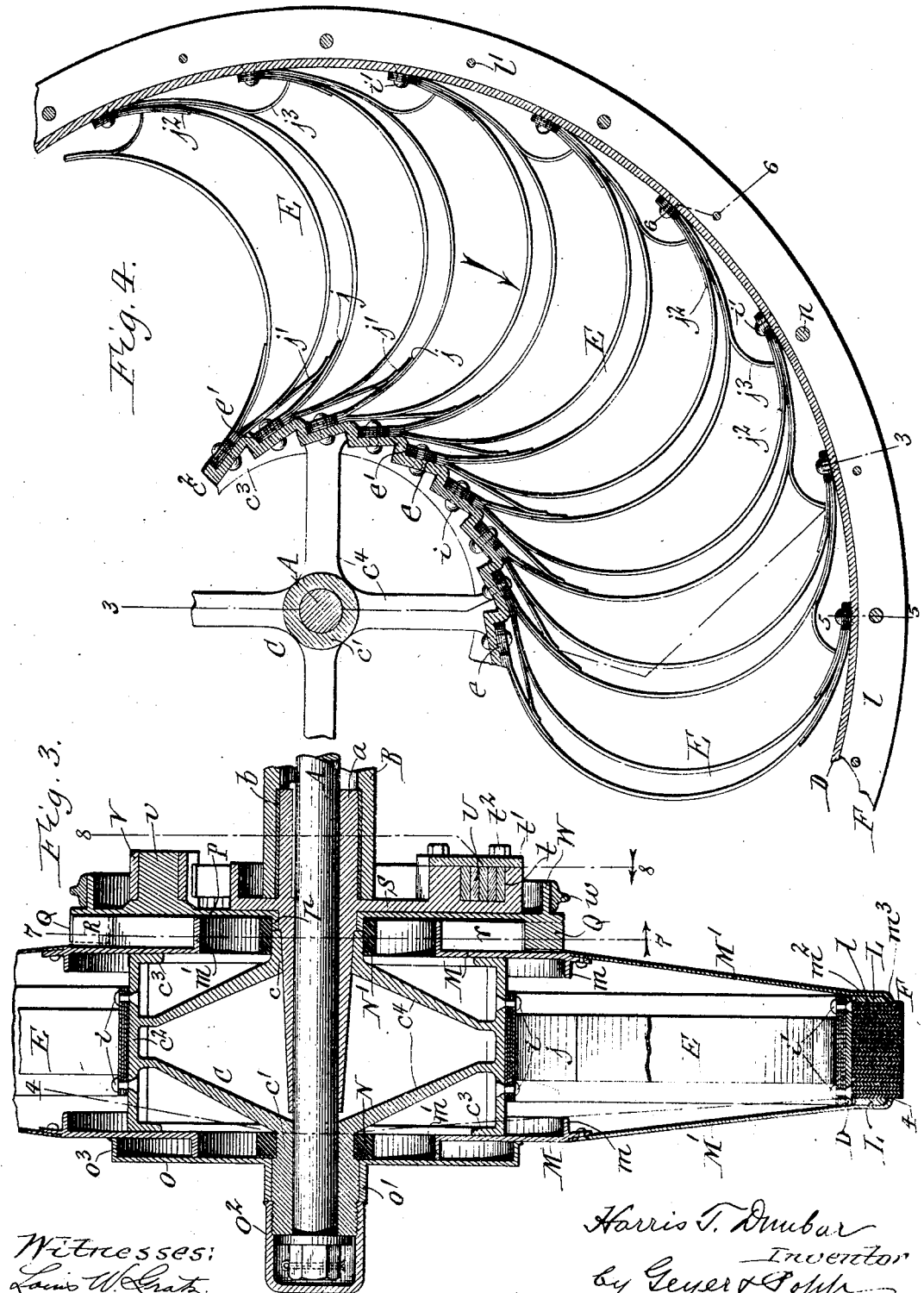

No. 782,952. PATENTED FEB. 21, 1905.
H. T. DUNBAR.
WHEEL.
APPLICATION FILED FEB. 23, 1904.
3 SHEETS—SHEET 3.
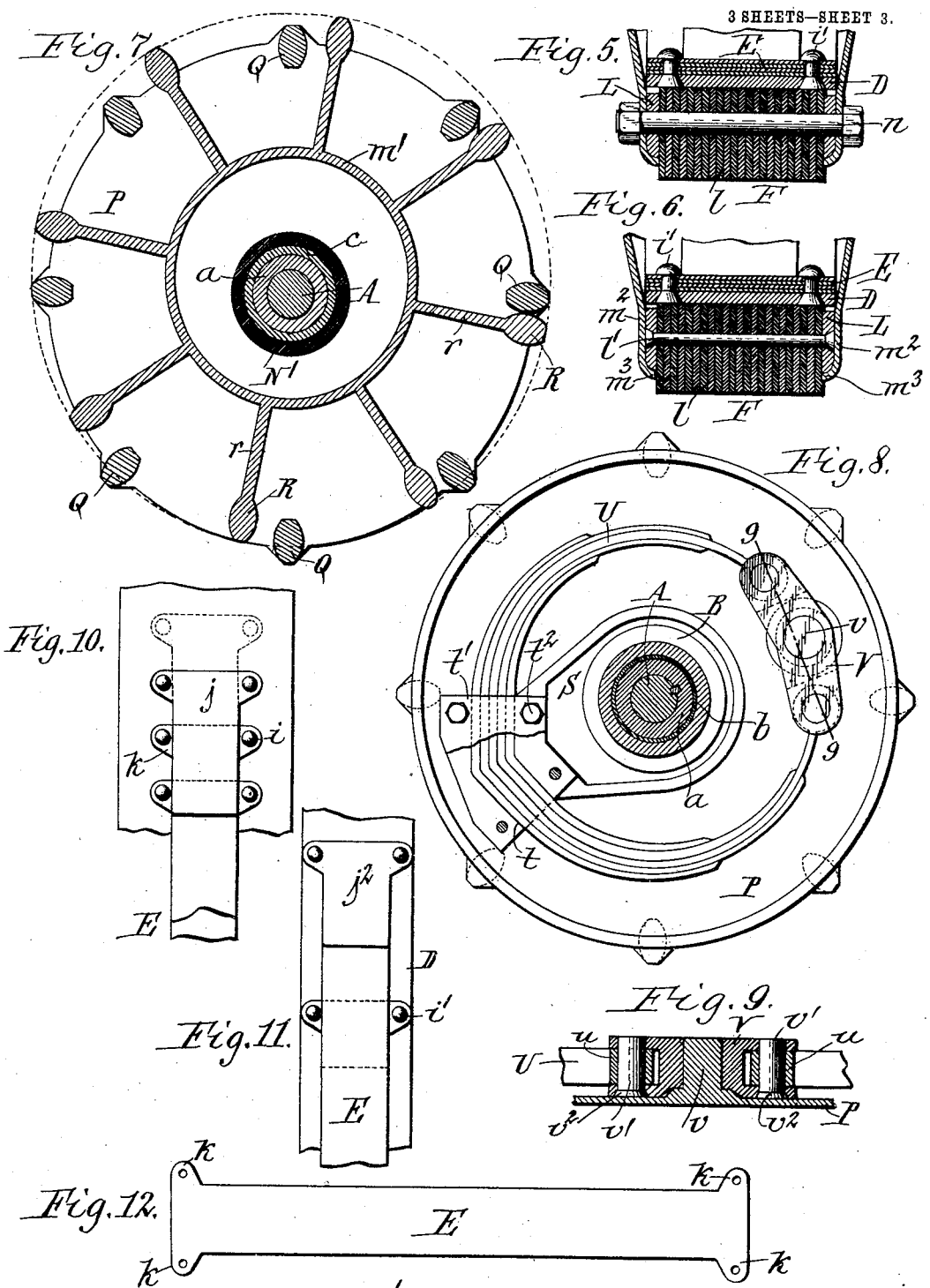
Witnesses: 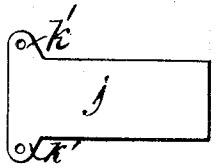 Harris T. Dunbar,
Inventor
By Geyer & Popp
Attorneys No. 782,952. Patented February 21, 1905.

UNITED STATES PATENT OFFICE.

HARRIS T. DUNBAR, OF BUFFALO, NEW YORK.

WHEEL.

SPECIFICATION forming part of Letters Patent No. 782,952, dated February 21, 1905.

Application filed February 23, 1904. Serial No. 194,673.

*To all whom it may concern:*

Be it known that I, HARRIS T. DUNBAR, a citizen of the United States, residing at Buffalo, in the county of Erie and State of New York, have invented new and useful Improvements in Wheels, of which the following is a specification.

This invention relates more particularly to that class of wheels in which the rim is flexibly connected with the hub, so as to produce a cushion effect which relieves the load upon the wheels from jars and shocks and renders riding in the vehicle more agreeable.

The object of this invention is the production of a wheel of this character for use in automobiles which is simple and durable in construction, efficient and reliable in operation, and in which the flexible connection between the rim and hub is relieved from driving strains.

In the accompanying drawings, consisting of three sheets, Figure 1 is a side elevation of my improved wheel. Fig. 2 is an edge view of the same. Fig. 3 is a fragmentary axial section of the lower part of the wheel, on an enlarged scale, taken in line 3 3, Fig. 4. Fig. 4 is a fragmentary radial section of the same in line 4 4, Fig. 3. Figs. 5 and 6 are fragmentary axial sections, on an enlarged scale, in lines 5 5 and 6 6, Fig. 4, respectively. Figs. 7 and 8 are radial sections on lines 7 7 and 8 8, Fig. 3, looking in opposite directions. Fig. 9 is a fragmentary cross-section in line 9 9, Fig. 8. Figs. 10 and 11 are fragmentary views showing the manner of connecting the flexible spokes with the rim and hub of the wheel. Figs. 12 and 13 are detached views of a spoke and one of the spoke-reinforcing springs, respectively.

Similar letters of reference indicate corresponding parts throughout the several views.

A represents the axle, which may be journaled on the frame of the vehicle in any suitable manner. As shown in the drawings, this axle is provided adjacent to the inner side of the wheel with a bearing-sleeve $a$, which is secured thereto and turns in a bearing $b$ in the surrounding tubular member B of the vehicle-frame.

The wheel comprises mainly a hub C, a rim or band D, a plurality of flexible spokes E, connecting the hub and rim, and a tire F applied to the outer side of the rim. The hub consists, preferably, of inner and outer collars $c\ c'$, mounted on the outer parts of the axle and the sleeve $a$ thereof, an annular rim $c^2$ arranged concentrically about the axle and having internal marginal flanges $c^3$, and radial arms or spiders $c^4$, connecting the collars $c\ c'$ with the rim. The outer side or peripheral face of the hub-rim is constructed in the form of ratchet-teeth, so as to form an annular row of tangential seats and an annular row of abrupt shoulders, each of which connects the base of one of said seats with the crest of the adjacent seat.

Each of the spokes is constructed of a strip or plate of spring metal in the form of the letter C and is secured at its inner and outer ends to the opposing faces of the hub and the rim. The several spokes are preferably so arranged that their convex sides face in the direction in which the wheel turns while moving forwardly, as shown in Fig. 4. In order to cause the spring action of the spokes to be distributed as uniformly as possible around the entire wheel, one end of each spoke and the corresponding end of the next forward spoke are together secured to one of the rims, while the other end of said first-mentioned spoke and the corresponding end of the next rearward spoke are together secured to the other rim, as shown in Fig. 4. By this means each spoke extends from the inner end of the next spoke on one of its sides to the other end of the next spoke on its opposite side, so that the several spokes are arranged in zigzag fashion in the space between the hub and rim. As shown in Fig. 4, the ends of adjacent spokes are arranged one on top of the other and secured by inner and outer rivets $i\ i'$ to the inner and outer rims. At their inner ends the spokes are secured to the tangential seats and abut against the adjacent shoulders of the hub-rim, while at their outer ends the spokes are secured to the curved inner side of the wheel rim or band. When the spokes are in place, each spoke is arranged at one end underneath the adjacent end of the next spoke on one side thereof, while its opposite end is arranged on top of the adjacent end of the next spoke on the other side thereof.

For the purpose of preventing sharp bends in the spokes at their attached ends short reinforcing-springs $j\ j'\ j^2\ j^3$ are applied to the inner and outer ends thereof and secured by the rivets $i\ i'$, together with the spokes, to the rims. Each of the reinforcing-springs $j$ bears against the top member of a pair of overlying spokes at the inner end thereof, while the companion spring $j'$ is interposed between the under member of said pair and the adjacent hub-seat. At its free end each spring $j'$ is bent so as to bear against the inner reinforcing-spring $j$ of the next pair of spokes. Each of the reinforcing-springs $j^2$ bears against the top member of a pair of overlying spokes at the outer end thereof, while the companion spring $j^3$ is interposed between the under member of said pair and the wheel rim or band. At its free end each spring $j^3$ is bent so as to bear against the outer reinforcing-spring $j^2$ of the next pair of spokes in the same manner in which the adjacent inner springs $j\ j'$ engage each other. By thus arranging the reinforcing-springs of the several spokes so that they engage each other the strains to which the spokes are successively subjected are gradually transmitted to adjacent spokes, thereby relieving the parts carried by the wheel from any sudden jars, which otherwise would not only be unpleasant, but also result in undue wear on the parts.

As many spokes are employed as can practically be introduced in the annular space between the hub and rim in order to obtain the maximum cushioning effect in the wheel. When the spokes are thus compactly arranged, they lie comparatively close to each other and would render it difficult to fasten the spokes centrally at their ends to the hub and outer rim. To permit of securing the spoke and the reinforcing-springs while thus closely assembled, each of the spokes is provided at its opposite ends with a pair of ears $k$, and each reinforcing-spring is provided at its attaching end with a similar pair of ears $k'$, said ears projecting laterally from the body of the spokes and springs and in a direction parallel with the axis of the wheel. The ears $k\ k'$ at the inner ends of the companion spokes and springs receive the rivets $i$, while the ears at the outer ends of the companion spokes and springs receive the rivets $i'$, as shown in Figs. 10 and 11. By this means the spokes and springs are attached to the rims on the side of the body portion thereof, where they are accessible and can be freely assembled or dismembered for making repairs or for other purposes, as shown in Fig. 3.

Although the tire may be of any suitable durable construction, I prefer that shown in the drawings, which consists of a plurality of tread-rings $l$, of rawhide, rubber, paper, wood, or similar material, arranged side by side, so as to form a laminated body, metal clamping-rings L applied to opposite sides of the tire-body, and rivets $l'$ or similar fastenings extending transversely through the clamping-rings and tread-rings and tying the same together.

The sides of the wheel are closed by a housing for the purpose of excluding dirt and water from the spokes and hub as well as rendering the wheel sightly and neat in appearance. The space between the hub and rim is closed by covers or webs, each of which consists of an inner ring-shaped section M, preferably constructed of cast metal, and an outer ring-shaped section M', preferably constructed of sheet metal. Each inner section has one end of the hub passing through its central opening and has a flat body which bears against one side of the hub-rim, an inwardly-projecting annular flange $m$ at the outer edge of the body, and an outwardly-projecting annular flange $m'$ at the inner edge of the body. The body of each outer web-section M' is conical and secured at its inner edge to the outer edge of the inner section and has an outer marginal flat portion $m^2$, which bears against one side of the wheel-rim and one of the tire-clamping rings, and an inwardly-projecting flange $m^3$ at the periphery of the marginal portion which engages over the outer edge of the respective clamping-ring, as shown in Figs. 3, 5, and 6. The marginal flat parts of both outer sections M' are secured to opposite sides of the tire by transverse bolts $n$ applied thereto at suitable intervals, thereby holding the tire against lateral displacement on the wheel-rim. The central openings in the inner ring-sections M of the webs are sufficiently large to permit the axle to play freely therein and shift its position radially relatively to the rim under normal conditions. When the axle is deflected or depressed an abnormal distance, due to an unusually heavy load or when running into a hole or against an obstruction, the axle is prevented from striking the webs with a sharp blow by means of a cushioning device. The latter preferably consists of two rubber rings or buffers N N' applied to the inner and outer collars of the hub within the flanges $m'$ of the webs, so that the latter are engaged by the buffers during an abnormal deflection of the axle and relieve the parts from undue jarring and straining.

The openings in the center of the webs are closed by means of disks or circular shields O P applied to said openings and supported concentrically with the hub and axle. The outer disk O is supported by means of its outwardly-projecting central sleeve $o'$, mounted on the outer collar of the hub, and a screw-cap $o^2$ on said collar engaging with said sleeve and holding the body of the outer disk in engagement with the inner flange $m'$ of the outer web. The outer disk is preferably provided at its periphery with an inwardly-projecting annular flange $o^3$, which engages with the adjacent inner section of the outer web and serves to brace and stiffen and also to produce a weather-tight joint between the parts. The body of the inner disk P bears against the inner flange $m'$ of the inner web and is provided centrally with an inwardly-projecting sleeve $p$, which is journaled on the axle-sleeve. The inner and outer disks or shields O P are sufficiently large to close the central openings in the inner and outer webs in the maximum deflected position of the axle relatively to the rim.

If the wheel is to be employed merely as a rolling support for the vehicle-body, the parts thus far described complete the same. When, however, the same is to be employed as the driving-wheel of an automobile, provision must be made for connecting the same with the motor. If desired, the motor may be coupled directly with the axle and the hub of the wheel may be secured to the axle, so that the power is transmitted by means of the spokes to the rim and tire for propelling the vehicle. I prefer, however, to mount the hub so that it is free to turn relatively to the axle and its bearing-sleeve and to transmit the power to the rim and tire in such manner so as to relieve the spokes entirely from the driving strains, thereby avoiding the liability of breaking the same.

The preferred means for driving the wheel shown in the drawings is constructed as follows: Q represents an annular series of driving-teeth arranged on the outer side of the inner or rear disk P and coöperating with a similar series of driven teeth R on the opposing side of the inner ring-section M of the adjacent inner or rear web. The teeth R are preferably connected by radial ribs $r$ with the inner flange $m'$ of the rear ring M for stiffening the same. As the rear or driving disk P is rotated by the motor its teeth Q engage with the teeth R of the adjacent rear or driven web, whereby motion is transmitted directly to the wheel-rim, thereby avoiding straining of the flexible spokes and permitting the latter to perform the sole function of cushioning the wheel. In practice the axle is always in a more or less depressed or eccentric position relatively to the wheel owing to the load on the axle, which causes the teeth of the wheel and the driving-disk to rotate in different paths. In order to prevent locking of the driving and driven teeth and cause them to mesh at the proper time for transmitting motion, a slack space is formed between the two sets of teeth. This permits the opposing pair of teeth on one side of the axle in a horizontal direction to operatively engage each other while the teeth of the remaining pairs separate more or less, as shown in Fig. 7, depending upon the relative eccentricity of the axle and wheel. The face of the teeth are of such length and preferably of convex form that they engage smoothly and permit the requisite radial movement relatively to one another without becoming disengaged. In backing up the teeth Q of the disk P first take up the slack space before bearing against the teeth R in the reverse direction, and thereafter the power is transmitted to the wheel in the same manner as during the forward movement of the wheel.

For the purpose of relieving the driving mechanism from any shock resulting from the wheel-rim striking an obstruction or from any other cause a cushioning device is interposed between the axle and the disk P, which is constructed as follows: S represents a driving arm or member projecting laterally from the bearing-sleeve $a$ of the axle and arranged in rear of the rear disk P. At its outer end the arm is provided with a socket $t$, in which the central part of a C-shaped cushioning-spring U is secured by a plate or cap $t'$, which is fastened to the arm so as to cover the spring and socket by means of screws $t^2$. The cushioning-spring is composed of a number of superposed spring-leaves and projects transversely with its ends from the socket toward the opposite side of the axle, so as to embrace the same. The socket and that part of the spring seated in the same are angular, preferably V-shaped, as shown in Fig. 8, to prevent the spring from becoming displaced lengthwise in the socket. On the side of the axle opposite to the socket is arranged a duplex link V, which is pivoted centrally on a stud $v$, projecting from the rear side of the rear disk P, parallel with the axle. The ends of the duplex link are bifurcated or forked, and the ends of the cushioning-spring have eyes $u$, which are pivoted in these forks by pins $v'$. The link lies close to the rear side of the rear disk P and is held in position therein by the spring. The pins $v'$ have heads $v^2$ at their inner ends, which are countersunk in the front side of the link and bear against the rear side of the disk P, whereby these pins are securely held against displacement without the use of any additional fastening. Upon moving the disk P and axle relatively to one another in either direction one arm of the spring U pulls and the other pushes, and the link turns on its pivot in adjusting itself to the varying position of the spring. By this means sudden starting or reversing of the motor or any backlash produced when the wheels strike an obstruction is modified and prevented from unduly racking the parts.

On the rear side of the rear disk P beyond the cushioned device the same is provided with an annular brake-flange W. The latter is surrounded by a brake-band $w$, which may be operated in any suitable manner.

When the wheel is being driven straight forward, only the inner web thereof is subject to strain, while the outer web at this time serves merely as a closure at the outer side of the wheel. Both webs, however, sustain the rim and tire against lateral displacement relatively to the hub by engaging against opposite sides thereof, and the webs are in turn supported by the disks which bear against the same, thereby insuring stability of the wheel and preventing distortion of the same while turning corners or while running in a tilted position.

I claim as my invention—

1. A wheel comprising a rim, a hub having its periphery constructed in the form of ratchet-teeth so as to produce an annular row of tangential seats and an annular row of abrupt shoulders each of which connects the base of one seat with the crest of the adjacent seat, and a plurality of flexible spokes each secured at its inner end to one of said seats and at its outer end to said rim, substantially as set forth.

2. A wheel comprising a hub, a rim, and a plurality of flexible spokes connecting said hub and rim, each spoke extending from the inner end of the next spoke on one side thereof to the outer end of the next spoke on the opposite side thereof, substantially as set forth.

3. A wheel comprising a hub, a rim, and a plurality of flexible spokes connecting said hub and rim, each spoke being arranged at one end underneath the adjacent end of the next spoke on one side thereof while its opposite end is arranged on top of the adjacent end of the next spoke on the other side thereof, substantially as set forth.

4. A wheel comprising a hub, a rim, a plurality of flexible spokes connecting the hub and rim and each arranged at one end underneath the adjacent end of the next spoke on one side thereof while its opposite end is arranged on top of the adjacent end of the next spoke on the other side thereof, and reinforcing-springs applied to said spokes at their fastenings to the hub and rim, substantially as set forth.

5. A wheel comprising a hub, a rim, a plurality of flexible spokes connecting the hub and rim and each arranged at one end underneath the adjacent end of the next spoke on one side thereof while its opposite end is arranged on top of the adjacent end of the next spoke on the other side thereof, and reinforcing-springs applied to said spokes at their fastenings to the hub and rim and the reinforcing-springs of adjacent spokes being arranged to engage each other, substantially as set forth.

6. A wheel comprising a hub, a rim, a plurality of flexible spokes connecting the hub and rim and each arranged at one end underneath the adjacent end of the next spoke on one side thereof while its opposite end is arranged on top of the adjacent end of the next spoke on the other side thereof, an upper reinforcing-spring applied to the top of each overlying spoke, and a lower reinforcing-spring arranged underneath each underlying spoke and bearing against the adjacent upper reinforcing-spring, substantially as set forth.

7. A wheel comprising a hub, a rim, a plurality of flexible spokes arranged closely together and each having ears at its opposite ends which project laterally from the body of the spoke in a direction parallel with the axis of the wheel, and fastenings connecting said ears with the hub and rim, substantially as set forth.

8. A wheel comprising a hub, a rim, and a plurality of flexible spokes each of which is provided at its ends with laterally-projecting ears, reinforcing-springs applied to the ends of the spokes and having laterally-projecting ears, and fastenings for connecting the ears of the spokes and the springs at opposite ends thereof with the hub and rim, substantially as set forth.

9. A wheel comprising a rim, a tire applied to the outer side of the rim and composed of a tread and clamping-rings applied to opposite sides of the tread, webs arranged on opposite sides of the rim and tire and having peripheral flanges engaging the outer edges of said clamping-rings and bolts connecting the tire, clamping-rings and webs, substantially as set forth.

10. A wheel comprising a rim, a tire applied to said rim and composed of a plurality of tread-rings arranged side by side, clamping-rings arranged on opposite sides of the tread-rings and rivets for connecting the tread and clamping rings, webs arranged on opposite sides of the rim and tire and provided with peripheral flanges which engage with the outer edges of said clamping-rings, and bolts connecting the webs and tire, substantially as set forth.

11. A wheel comprising a hub, a rim, flexible spokes connecting the hub and rim, webs extending on opposite sides of the wheel from the rim to the hub and having central openings, and disks arranged to close said openings in the webs and supported concentrically with the hub, substantially as set forth.

12. A wheel comprising a hub, a rim, flexible spokes connecting the hub and rim, webs extending on opposite sides of the wheel from the rim to the hub and having central openings, and buffers arranged on the hub in position to be engaged by said webs, substantially as set forth.

13. A wheel comprising a hub, a rim, flexible spokes connecting the hub and rim, webs extending on opposite sides of the wheel from the rim to the hub and having central openings through which the ends of the hubs project, and rubber buffer-rings arranged on the ends of the hub in position to be engaged by the inner edges of said webs, substantially as set forth.

14. The combination of an axle having a bearing-sleeve, a hub mounted on said axle and sleeve, a rim, flexible spokes connecting the hub and rim, webs extending on opposite sides of the wheel from the rim to the hub and having central openings, disks arranged to close said openings in the webs, one of the disks being mounted on said sleeve while the other disk is mounted on said hub, and a screw-cap applied to said hub for holding the outer disk in place, substantially as set forth.

Witness my hand this 15th day of February, 1904.

HARRIS T. DUNBAR.

Witnesses:
F. E. DUNBAR,
THEO. L. POPP.